(12) United States Patent  
Roesler

(10) Patent No.: US 8,209,647 B1
(45) Date of Patent: Jun. 26, 2012

(54) EXTENSIBLE VERIFICATION SYSTEM

(75) Inventor: Robert Roesler, Ottawa (CA)

(73) Assignee: Cadence Design Systems, Inc., San Jose, CA (US)

( * ) Notice: Subject to any disclaimer, the term of this patent is extended or adjusted under 35 U.S.C. 154(b) by 11 days.

(21) Appl. No.: 12/034,601

(22) Filed: Feb. 20, 2008

(51) Int. Cl.
*G06F 17/50* (2006.01)

(52) U.S. Cl. ..................................... 716/106

(58) Field of Classification Search ............ 716/1, 5, 716/100, 106
See application file for complete search history.

(56) References Cited

U.S. PATENT DOCUMENTS

| | | | |
|---|---|---|---|
| 5,590,049 A | 12/1996 | Arora | |
| 5,812,431 A | 9/1998 | Kundert | |
| 6,324,678 B1 * | 11/2001 | Dangelo et al. | 716/103 |
| 6,578,174 B2 | 6/2003 | Zizzo | |
| 6,721,922 B1 | 4/2004 | Walters et al. | |
| 6,848,084 B1 | 1/2005 | Pandey et al. | |
| 7,065,726 B1 * | 6/2006 | Singhal et al. | 716/106 |
| 7,114,111 B2 | 9/2006 | Noy | |
| 7,124,383 B2 | 10/2006 | Chen et al. | |
| 7,225,423 B2 * | 5/2007 | Bhattacharya et al. | 716/102 |
| 7,243,321 B2 | 7/2007 | Wang et al. | |
| 7,530,048 B2 | 5/2009 | Joshi | |
| 7,669,155 B2 * | 2/2010 | Ganesan et al. | 716/100 |
| 7,669,158 B2 | 2/2010 | Kamat | |
| 7,707,528 B1 | 4/2010 | White et al. | |
| 7,711,536 B2 | 5/2010 | McNamara | |
| 7,712,056 B2 | 5/2010 | White et al. | |
| 7,761,836 B1 | 7/2010 | Wadland et al. | |
| 7,770,142 B1 | 8/2010 | Shmayovitsh et al. | |
| 7,792,933 B2 | 9/2010 | Butts et al. | |
| 8,069,434 B2 * | 11/2011 | Ploesser et al. | 717/104 |
| 2002/0002698 A1 * | 1/2002 | Hekmatpour | 716/4 |
| 2002/0069396 A1 * | 6/2002 | Bhattacharya et al. | 716/7 |
| 2008/0244491 A1 * | 10/2008 | Ganesan et al. | 716/10 |
| 2009/0037859 A1 * | 2/2009 | Thakur et al. | 716/5 |
| 2009/0199142 A1 * | 8/2009 | Arunachalam et al. | 716/5 |
| 2009/0313594 A1 * | 12/2009 | Arunachalam | 716/9 |
| 2010/0042963 A1 * | 2/2010 | Bruno et al. | 716/10 |

OTHER PUBLICATIONS

Kropf, T. "Introduction to Formal Hardware Verification", Springer-Verlag, Berlin Heidelberg, 1999, pp. 1-29.

* cited by examiner

*Primary Examiner* — Suchin Parihar
(74) *Attorney, Agent, or Firm* — Alford Law Group, Inc.; William E. Alford; Eric R. Scheuerlein

(57) ABSTRACT

An extensible design verification system and methods thereof are disclosed. Pre-defined constraints from an integrated verification application are registered with a core which manages the verification system. The core is utilized by the integrated verification application to execute one or more verification tasks to generate a result. The result can be captured by a user interface. Constraints and the user-interface can be either pre-defined or user-defined. User-defined constraints and interface are managed in the same manner as those that are pre-defined. The user-defined constraints and interface are exportable for reuse by other designs.

25 Claims, 5 Drawing Sheets

EXTENSIBLE VERIFICATION SYSTEM

BACKGROUND OF THE INVENTION

As electronic design complexity increases in many design domains including signal integrity (SI), electromagnetic interference (EMI), manufacturing, and power, the number and type of constraints imposed on a design has grown substantially. It is now clear that a single out-of-the-box computer aided design (CAD) verification solution (or application) is not sufficient to accurately validate all design requirements for today's complex designs. Most companies have unique requirements based upon their design practices and products they are trying to deliver. Solution providers have not been able to support all these requirements due to the diverse range of customer needs and narrow applicability of each. Users have had to add extensions to their applications to cover their new design constraints. Adding user-defined extensions to verification testing has required users to either create a standalone verification test, or request the solutions provider to update a built-in verification application system to include the new test.

Standalone design specific verification has historically been left to the end user to develop and deploy using a mix of applications previously delivered by the solutions provider. Most applications have an extension language and/or a mechanism to access design data. The user would typically write a complete program which extracts the data, computes the results based on the data, and then optionally determines if the results represent a violation. The results/violations are presented in a report that rarely has links back to the actual design data which is being verified. The overall solution is not well integrated to the original application so its usefulness is limited and not very modular, so reuse is difficult.

One prior approach to generate needed extensions was a request made by the end-user for the solutions provider to update the user's existing system to support a new verification requirement. This approach only works if (1) the new verification system fits cleanly into the existing system and (2) it applies to many customers to justify the solutions provider's costs. Even if the verification system meets these two criteria, it may still not be delivered for a significant time due to resource or scheduling issues. This delay may not be acceptable in today's consumer driven marketplace.

Other factors effecting today's systems create difficulties for users requiring custom extensions. A constraint's behavior is defined in the check itself, that is, the code which computes the results also codes the constraint's behavior which necessitates running the application to access the constraint. These systems capture the constraints in a separate user interface, through a separate file, or injected via other custom software. Systems do not do a good job keeping measurements simple and coding them using a proven set of lower-level functions or predicates. The verification checks provide only lengthy batch reports that can be used to review the current implementation. In certain situations, the report may be too late and can result in significant design re-work. In situations where batch verification is necessary and acceptable, the reports generated by today's systems can be disjoint, not providing an adequate level of integration.

SUMMARY OF THE INVENTION

The present invention is a computer aided design verification system. The invention includes; an integrated application, an editor, a constraint database, and a central core. The integrated application has a pre-defined constraint. The editor is used for creating and viewing a user-defined constraint which is provided by an external user. The constraint database is used for storing the user-defined constraint and the pre-defined constraint. The central core is used for centrally managing the computer aided design verification system. The central core is also used for initiating and executing a verification task, generating a result, and communicating the result to the integrated application.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not limitation of the present technology. In fact, it will be apparent to those skilled in the art that modifications and variations can be made in the present technology without departing from the spirit and scope thereof. For instance, features illustrated or described as part of one embodiment may be used on another embodiment to yield a still further embodiment. Thus, it is intended that the present subject matter covers such modifications and variations as come within the scope of the appended claims and their equivalents.

The present invention includes an eXtensible Verification System (XVS) which can be configured to validate a product across all unique design challenges based upon any specific set of requirements or constraints. User-defined extensions may be required for various aspects of design validation. Unlike other CAD systems, XVS includes the necessary infrastructure for users to extend the built-in verification system to meet all of their design needs. At the core, XVS allows the user to manage the design specific constraints and the predicates/measurements needed to validate them. XVS manages all new constraints enabling the user to define and capture each unique requirement. XVS manages all measurements and their association with the constraints. Once configured, XVS provides seamless application integration to drive the application's implementation and provide feedback on the correctness of the design across the required domains. Thus, XVS gives the end user control over the resources required for timely execution of the design verification.

Figure 1:
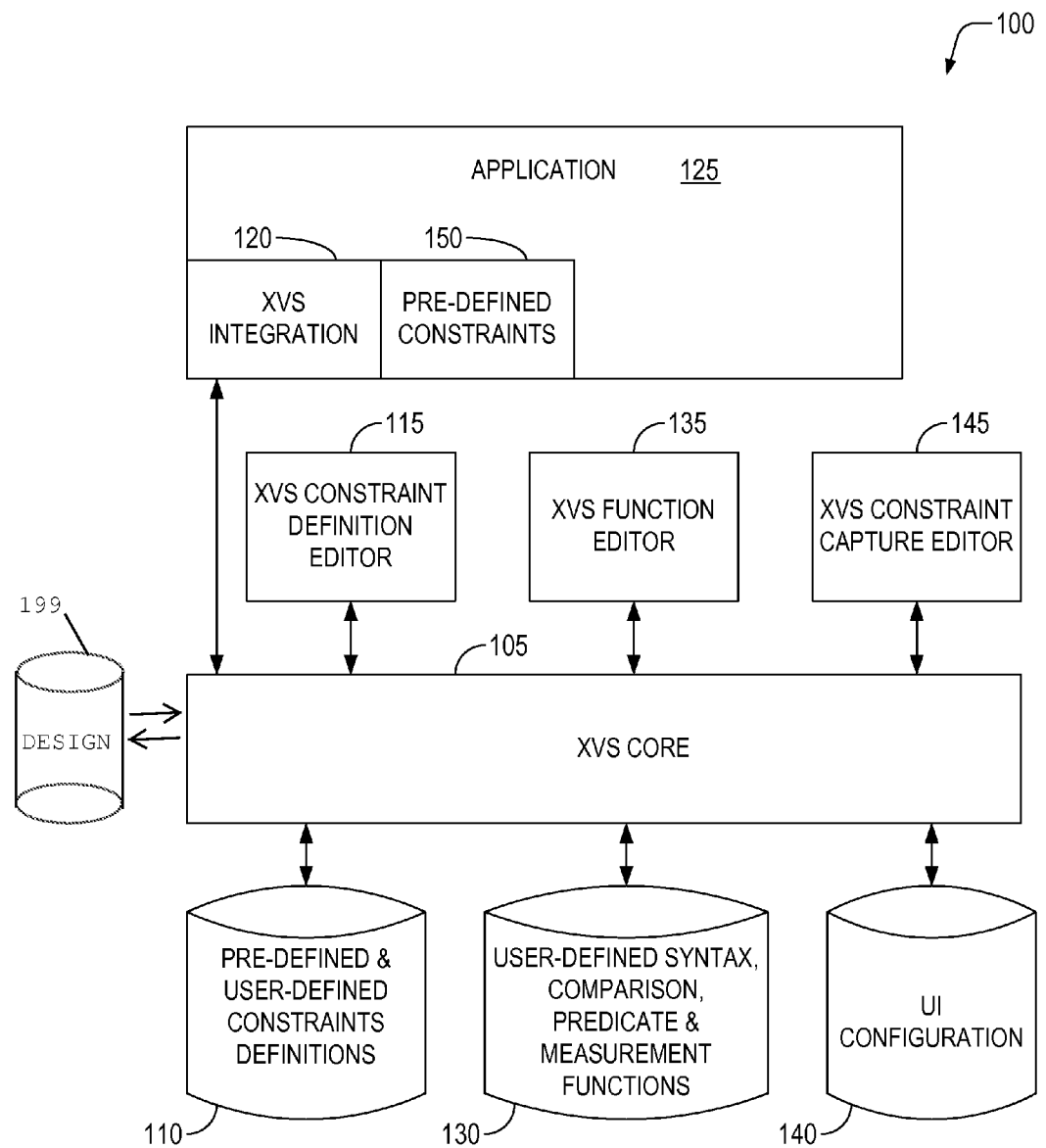
FIG. 1 illustrates a data flow diagram for a system according to an embodiment of the present invention.

With reference to FIG. 1, a simplified data flow diagram of an embodiment of an eXtensible Verification System (XVS) 100 is illustrated for verifying a computer aided design 199. The XVS 100 includes an XVS core 105 module to centrally manage all validation system operations. All constraints that are stored in a pre-defined and user-defined constraints definitions 110 database are managed by the XVS core 105 and can be accessed by a verification application 125 module through an XVS integration 120 module.

The creation and editing of user-defined constraints are performed through an XVS constraint definition editor 115 module and an XVS function editor 135, enabling the user to fully model the behavior of user-defined constraints.

Application 125, a verification application, initializes the XVS core by registering pre-defined constraints (for example, measurements and predicates) stored in a pre-defined constraints 150 database upon initialization of the XVS core. The XVS core 105 dispatches, manages, and implements the verification tasks requested by verification application 125. The system is thus able to characterize and register functions and characteristics that are pre-defined.

All associated data stored in a user-defined syntax, comparison, predicate, and measurement functions 130 data base is edited and viewed with the XVS function editor 135 module under management by the XVS core 105. The XVS function editor 135 module provides an environment for the user to characterize, create, edit, and test user-defined functions to support design specific verification. A function is a pre-defined operation or a user-defined operation including; syntax check, comparison, predicate, and measurement which are defined in Table 1.

All constraints and their verification results are edited, viewed, and validated through an XVS constraint capture editor 145 module. Any specific editing and viewing configurations are stored in a user interface (UI) configurations 140 database and can be shared with all design starts. The XVS constraint capture editor 145 module and the UI configurations 140 database are also managed by XVS core 105.

The XVS 100 thus delivers a novel, fully extensible verification platform since both user-defined and pre-defined operations are supported and plugged into the application seamlessly for verification. The XVS methodology and infrastructure ensures all extensions have substantially identical behavior to all built-in validations. The user does not need to create and manage a separate environment for design specific requirements. By providing this infrastructure, XVS 100 promotes a better integrated, single, less complex validation strategy that is less likely to miss violations than present extension creation approaches. Thus, the XVS 100 strengthens the correct-by-design philosophy.

Constraint Definitions

XVS core 105 manages all constraint definitions to ensure it has the necessary characteristics for all verification checks. The definition models the behavior of the constraint. An example of a constraint definition is "The constraint is a minimum requirement, used for controlling spacing, and is associated with the Embedded-Resistor measurement." Table 1 defines the constraint and lists a set of example characteristics and functions for a pre-defined or user-defined constraint. The characteristics are stored in pre-defined and user-defined constraints definitions 110 database. The constraint definition will reference functions which are stored in user-defined syntax, comparison, predicate, and measurement functions 130 database and in pre-defined constraints 150 database. It should be obvious to one skilled in the art that many of the data elements stored in databases of the invention may have equivalent meaning or use whether referenced in the singular or plural form and may thus be used interchangeably. For example, a single constraint or multiple constraints may be stored, and a single constraint may reference a single or multiple functions.

TABLE 1

| Characteristic | Definition |
| --- | --- |
| Name/Identifier (ID) | Used to communicate to and from XVS core 105. |
| Description | Describes the constraint both verbally and pictorially. |
| Data Type | A storage class for the constraint. Some examples may be string, double, and list. |
| Category | Defines the category of the constraint. Some examples may be none, time, voltage, and distance. |
| Units | The measurement units for applicable categories. Some examples may be mV for voltage, ns for time, and mils for distance. |
| Range | The valid range for applicable categories. An example may be 0 <= length <= 1000. |
| Valid Objects | The valid object types for the constraint. Some examples may be Buses, Nets, and Pins. |
| Related Constraints | All constraints which are related to this one. The XVS core will process all related constraints when any of them are updated. |
| Domain | The constraint's applicable domain(s). Some examples may be SI, EMI, and Manufacturing. |
| Analysis Flags | Defines analysis behavior of the constraint (see individual flags defined below). |
| FullyRouted Flag | When set, do not analyze until object is fully routed. |
| FullyPlaced Flag | When set, do not analyze until all related objects are fully placed. |
| OnLine Flag | When set, analyze real time as implementation changes. Batch if not set. |
| AnalyzeOnConstraint-Change Flag | Rerun analysis when constraint value changes. If not set, only the comparison function is trigger on constraint change. |
| ReadOnly Flag | Do not allow editing in the UI. Constraint can only be injected into the system, programmatically. |
| Function | Definition |
| Syntax | Used to determine if a constraint value is correct. The XVS core will support a default syntax check based upon the category, units, and range. If this is insufficient, a custom syntax function can be defined by the user and will be invoked if the default check passes. |
| Measurement | Used to compute and return result(s) for the object being analyzed and is associated with a constraint. E.g., a maximum length constraint for a timing path would be associated with a measurement which computes and returns the actual length of the timing path. Measurements are either pre-defined or user-defined. Pre-defined measurements are delivered by the Application, managed by the XVS core (registered) and provide common results which can be reused for different validations. User-defined measurements are created by the user and managed by the XVS core. |
| Comparison | Used to compare a constraint value against a computed result(s) to determine if a violation exists. The Boolean operators; equal, less than, greater than, and target/tolerance (equal with range) are delivered with the XVS core. Comparisons are either pre-defined or user-defined. Custom functions require that an external comparison function be defined by the user. |
| Predicate | Used to compute and return a value. E.g., the length of a timing path. Predicates are either pre-defined or user-defined and are used to build up measurements. |

Modeling Constraints

Figure 2:
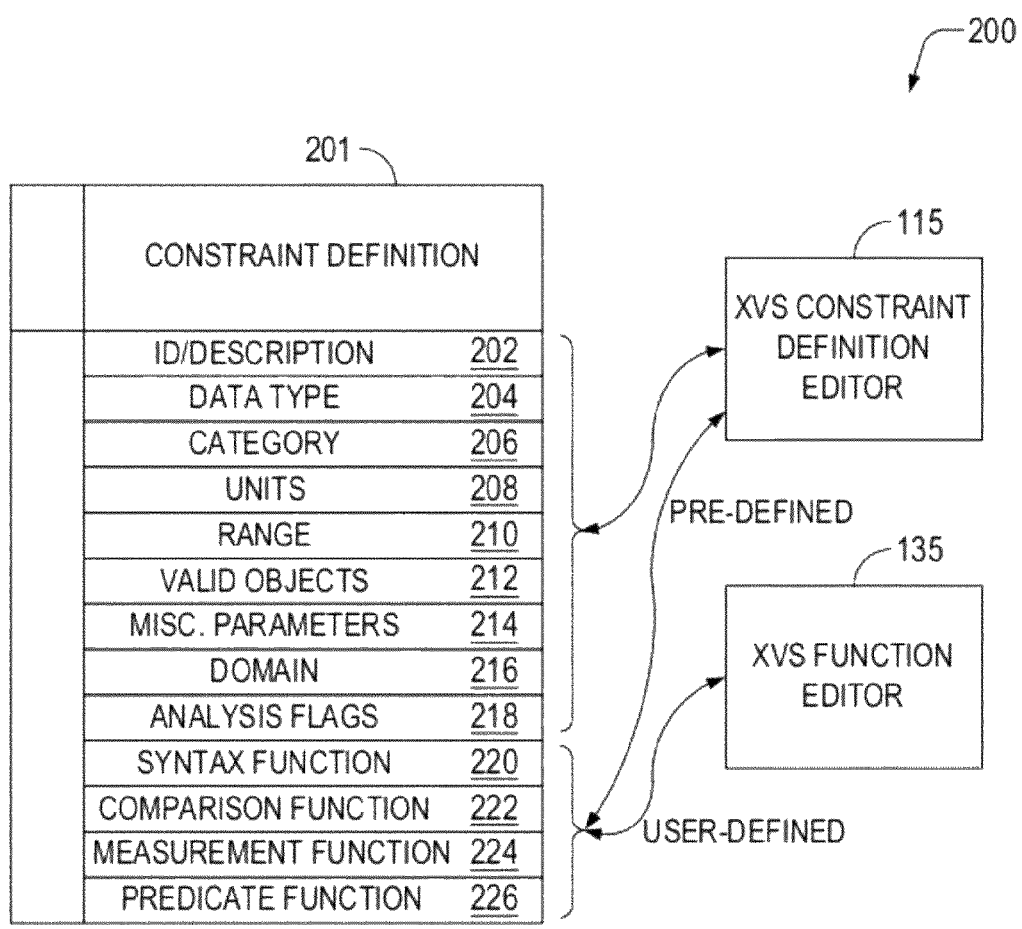
FIG. 2 illustrates a data flow diagram of a constraint modeling architecture according to an embodiment of the present invention.

Modeling a constraint's behavior is done by providing access to all of its characteristics and functions. Referring to FIG. 2, an embodiment of a constraint modeling 200 data flow diagram is illustrated. A XVS constraint definition editor 115 and a XVS function editor 135 modules are illustrated providing the same functions and features as described with reference to FIG. 1. A set of characteristics and functions of a constraint definition 201 data, substantially corresponding to the characteristics and functions listed in Table 1, is illustrated in FIG. 2. The set of characteristics of the constraint definition include; an ID/description 202, a data type 204, a category 206, units 208, a range 210, valid objects 212, miscellaneous parameters 214, a domain 216, and an analysis flags 218. These characteristics are accessed by XVS constraint definition editor 115 and are stored in pre-defined and user-defined constraints definitions 110 database referenced in FIG. 1. Also included in the set of functions of constraint definition 201 illustrated in FIG. 2 are; a syntax function 220, a comparison function 222, a measurement function 224, and a predicate function 226. User-defined functions are accessed by XVS function editor 135 and are stored in user-defined syntax, comparison, predicate & measurement functions 130 database referenced in FIG. 1. FIG. 2 illustrates pre-defined functions are accessed by XVS constraint definition editor 115 and are stored in predefined constraints 150 database also referenced in FIG. 1. Once a pre-defined function is edited (selected) using XVS constraint definition editor 115, the function is then accessible for customization in XVS function editor 135. Analysis flags 218, illustrated in FIG. 2, may include the individual flags listed in Table 1. Thus, each characteristic and function of a constraint definition is supported through one of the XVS editors.

Managing Predefined and User-Defined Functions

Figure 3:
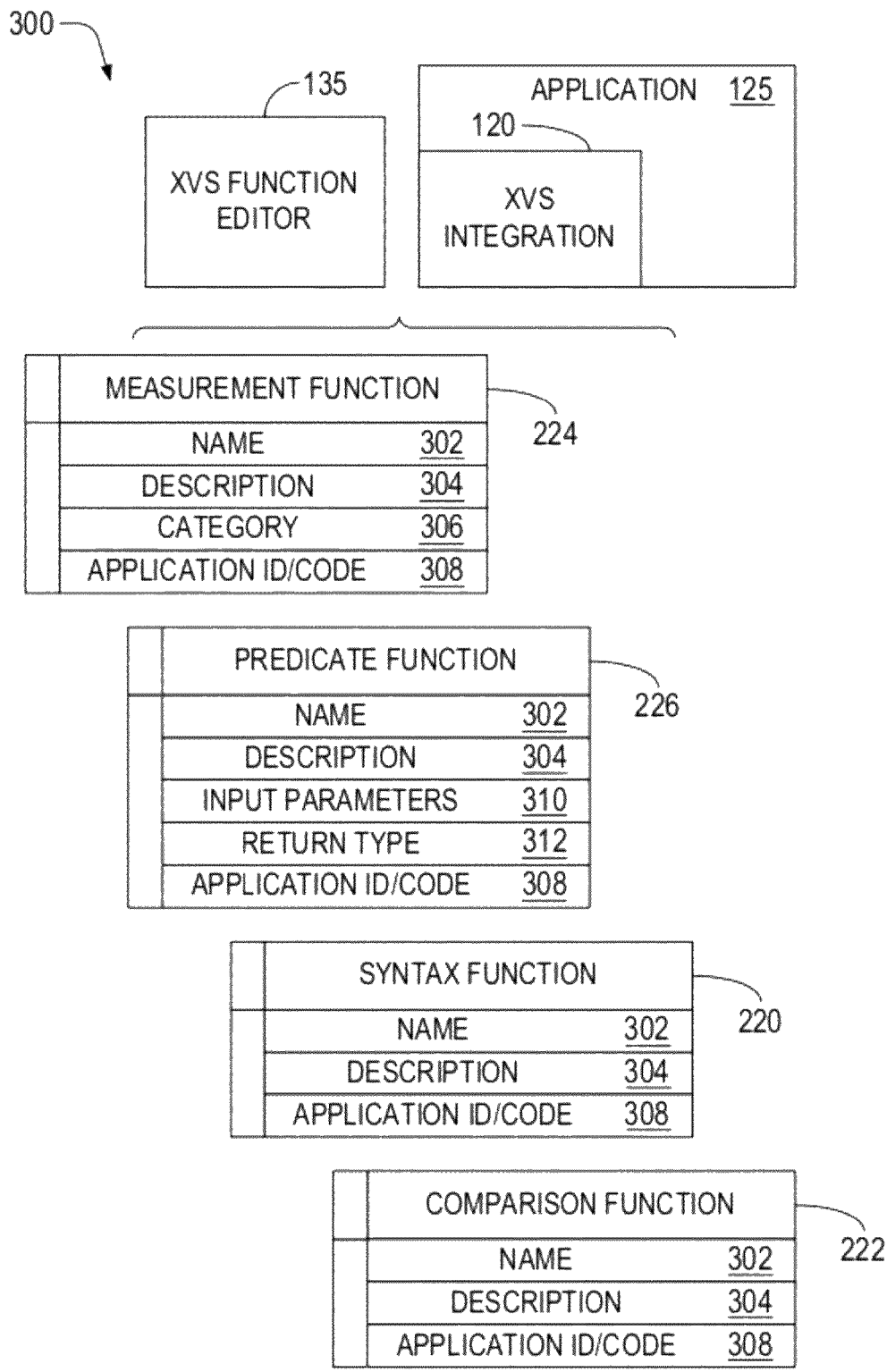
FIG. 3 illustrates a data flow diagram of a managing functions architecture according to an embodiment of the present invention.

With reference to FIG. 3, an embodiment of a managing functions 300 data flow diagram is illustrated. An application 125, using XVS integration 120, and a XVS function editor 135 modules are illustrated providing the same functions and features as described with reference to FIG. 1. A syntax function 220, a comparison function 222, a measurement function 224, and a predicate function 226 data are illustrated providing the same functions and features as described with reference to FIG. 2. Application 125, via XVS integration 120, and XVS function editor 135 access the following: syntax function 220, comparison function 222, measurement function 224, and predicate function 226 data. These may each include both predefined and user-defined functions. FIG. 3 also illustrates the characteristics associated with each of the functions which are described in greater detail below.

XVS core 105, referenced in FIG. 1, manages functions. This management includes the registration of functions, the dispatching of functions that are needed for verification, and the creation of user-defined functions. As FIG. 3 illustrates, pre-defined functions are registered with the XVS core by application 125 through XVS integration 120. User-defined measurement, predicate, syntax, and comparison functions will be viewed and edited in XVS function editor 135. The XVS function editor provides an environment for the user to characterize, create, edit and test custom software to support design specific verification.

FIG. 3 illustrates Syntax function 220, comparison function 222, measurement function 224, and predicate function 226, and all of these contain an application ID/code 308 characteristic. Pre-defined functions are supported by application 125 through XVS integration 120 and will contain the application ID portion of application ID/code 308. The application ID is managed by the application so that it knows which function should be executed when a request from the XVS core is made. However, user-defined functions include the actual implementation code portion of application ID/code 308 which may be written in an interpretive programming language. All functions 220, 222, 224, and 226 also include a description 304 characteristic so users can review what is available in the system and a name 302 characteristic used to communicate to and from XVS core 105.

Measurement function 224 includes a category 306 characteristic. When associating a measurement with a constraint, the categories of each will preferably match. For instance, a time related constraint can only be associated with a measurement from the same time category. Predicate function 226 includes an input parameter 310 and a return type 312 characteristics. The parameter defines the input to the function. When inserting a predicate into a measurement (or higher-level predicate) XVS Editor 135 automatically fill-ins the parameter names. The user can then ensure that these parameters are populated. The return type defines what type of value is returned. The return type helps the user decide how to handle the returned value.

As referenced in Table 1 along with FIGS. 1 through 3, a constraint definition may require up to four user-defined functions if the pre-defined ones provided by XVS 100 are insufficient. For example, syntax function 220 for checking the constraint value, measurement function 224 for computing results, predicate function 226 for building measurements, and comparison function 222 for determining if a violation exists can all be created by the user and managed by XVS core 105. The XVS core supports a common paradigm in XVS function editor 135 to capture all of these functions using the application's extension language. The extension language may be interpretive such as List Processing Language (LISP) or Tool Command Language/configurable graphical UI framework toolkit (Tcl/Tk), so that the four functions can be built interactively and loaded when XVS core 105 is initialized.

XVS function editor 135 includes a template for the functions. Note that the template is unique for each different type of function. The XVS function editor allows the user to create/edit and test a function. Unique editor features include the auto-insertion of functions which return values for other objects, insertion of lower-level predicates which are used to build up higher level function, and the ability to test a function before using it. The test command will execute the function prompting the user for input, as required. For instance, a syntaxCheck1 function requires a constraint value. Output from the test command will include; the function's return value (if successful), any programming suggestions that find portability problems and certain types of coding errors similar to the results of a static analysis tool known to those skilled in the art and called "lint" (LINT-like), and any intermediate results (as generated by the function). Table 2 includes a LISP pseudo code type listing template for syntax function 220. Syntax function 220 will validate a constraint value for a specific object and return success or fail with an error message for the later. As with all the example programming structures presented herein, Table 2 is not intended as a compilable or executable portion of code, but as an example programming or other structure that reflects a non-limiting implementation of a process or method consistent with the present invention.

TABLE 2

```
(syntaxCheck1(    <objectIdentifier>      ← Object being edited.
                  <constraintIdentfier>,  ← Constraint being edited.
                  <constraintValue>,      ← Constraint value being set.
                  <errorMsg> )            ← Error message buffer
    (let (returnCode)
       // User-defined syntax checker for the constraintValue. If syntax is
         invalid, update
       // returnCode and populate the errorMsg.
       returnCode = OK;
       // Insert code to check syntax here and populate error message if
         one occurs.
       // Return syntax result.
       returnCode;
    )
)
```

Table 3 includes a LISP pseudo code type listing template for measurement function 224. The measurement function will compute and return (populate) a unique result for an object. If the result cannot be populated, the reason will be populated and an error will be returned.

TABLE 3

```
(measurement1(   <objectIdentifier>,      ← Object being analyzed.
                 <constraintIdentfier>,    ← Constraint being analyzed.
                 <actualIdentifier>,       ← Computed value to update.
                 <statusIdentifier>,       ← Status message identifier.
                 <measureMode> )           ← Analysis mode.
  (let (returnCode)
    // User-defined measurement being run for constraintValue.
       Computed results should
    // be returned in the actualIdentifier. If computation fails,
       statusIdentifier should be
    // updated the reason why the measurement failed.
    //
    returnCode = OK;
    // Insert built-in predicates/functions to compute results here. E.g.
    //    len = GetLength( <objectIdentifier> )
    //
    // Use built-in predicates/functions to populate computed value or
       status. E.g.
    //    returnCode = PutValue( <objectIdentifier>, <actualIdentifier>,
       len )
    // or
    //    PutValue( <objectIdentifier>, <statusIdentifier>, "Failed:
       Object is unplaced" )
    //    returnCode = FAIL;
    //
    // Return measurement state.
    returnCode;
  )
)
```

Table 4 includes a LISP pseudo code type listing template for comparison function 222. The comparison function is used to determine if the constraint and results represent a violation. If a violation is found, a negative margin is populated and the appropriate code is returned.

TABLE 4

```
(comparison1(   <objectIdentifier>,     ← Object being analyzed.
                <constraintIdentfier>,   ← Constraint being analyzed.
                <actualIdentifier>,      ← Computed value.
                <marginIdentifier> )     ← Margin.
  (let (returnCode, cnsValue, actualValue, MarginValue)
    // Compare the constraint (constraintIdentifier) and the computed
       actual value
    // (actualIdentifier) and return the status.
    //    VIOLATION - Violation has occurred.
    //    PASS - No violation.
    //    FAIL - Comparison failed because Actual does not exist.
    //
    // The function will also update the result of the comparison
       (marginIdentifier).
    // The margin reflects the degree of the violation. E.g.
    // <0 - The smaller the value, the more severe the violation.
    // >=0 - The larger the value, the more successful the pass.
    //
    returnCode = PASS;
    marginValue = 1.0;
    // Access the constraint and actual values.
    //
    cnsValue = GetValue( <objectIdentifier>. <constraintIdentifier> )
    actualValue = GetValue( <objectIdentifier>. <actualIdentifier> )
    // Insert code to compare cnsValue and actualValue. Update the
       margin and
    // return code accordingly. E.g.
    //
    // marginValue = cnsValue - actualValue; // Maximum type
       constraint.
    // if(marginValue < 0 then
    //    returnCode = VIOLATION;
```

TABLE 4-continued

```
// )
// Populate the margin and return the violations status.
//
PutValue( <objectIdentifier>, <,marginIdentifier>, marginValue )
returnCode;
  )
)
```

The ability to completely define a constraint's behavior is the first critical step in supporting design specific requirements. The definition promotes consistent behavior and provides the necessary foundation for the correct-by-design philosophy. XVS 100 provides support for reusing all constraint definitions through export and auto-loading for all new design starts. Thus, XVS 100 allows the user to capture all characteristics and functions necessary to model the behavior of the design specific constraints. This critical advantage ensures all constraints behave consistently by forcing a somewhat strict methodology.

Measurements

XVS core 105 will manage measurement functions 224 which are used to compute result(s) for an object being validated. In this example, measurement functions 224 are either pre-defined or user-defined. Pre-defined measurement functions 224 are supported by application 125 and are provided as common computations which may be reused or assist in the construction of different user-defined constraints. For example, the length of an object. During XVS core 105 initialization, application 125 will register all application supported measurement functions 224. Thus, XVS 100 splits the constraint definition from the measurement and final validation. This new approach promotes more consistent constraint behavior between checks with fewer false or missing violations, and better performance than prior tools with their constraints embedded within the application. XVS 100 also provides easier maintenance as constraints and measurements evolve over time, independent of the software that is computing the results.

User-defined measurement functions 224 are created by the user and compute a unique verification result for an object. For example, the distance of an object to its nearest plane. XVS core 105 supports the creation of user-defined measurement functions 224 as introduced above. The XVS core promotes a somewhat strict methodology for coding user-defined measurement functions 224 which is aligned with many common programming practices. Measurement functions 224 are preferably built on common, proven lower-level functionality. Similar to most high-level programs, measurement functions 224 should call functions/predicates (for example, IsComponentPlaced, or GetDistanceBetween2Objects) that have been previously validated for both correctness and performance. If a pre-defined predicate does not exist, XVS core 105 also allows the user to create new user-defined predicates using function editor 135. To assist the user with the construction of user-defined constraints, XVS core 105 provides a mechanism for application 125 to register its pre-defined constraints 150. For example, any of the registered pre-defined predicates can then be inserted into user-defined measurement function 224 by the user through XVS function editor 135. Unlike measurement function 224, syntax function 220 check, or comparison function 222, the template for predicate function 226 requires that input parameters 310 and return type 312 also be defined by the user. Table 5 includes a LISP pseudo code type listing template for predicate function 226. XVS 100 thus provides an environment which guides users during measurement coding and provides easy access to the necessary functionality which is an improvement over older systems.

TABLE 5

```
(predicate1(    <param1>,    ← As defined by the user.
                <param2>,    ← As defined by the user.
                ...)
    (let (returnStringValue)
        // Insert code to compute a return value. E.g.
        //
        // returnStringValue = "This is a string".
        // Return answer.
        returnStringValue;
    )
)
```

XVS core 105 provides support for reusing user-defined measurement functions 224 and predicates function 226. A large amount of work goes into building a company's specific validations portfolio. All of this work can be reused by exporting all pertinent information and configuring XVS core 105 to load it for new design starts. XVS 100 manages all predicates and measurements which are used to compute intermediate values and final results, respectively. Thus, by providing the necessary infrastructure and a somewhat strict methodology, XVS 100 delivers measurement programs that are managed to optimize both reuse and performance which is an advantage as customers validate their current and future designs.

Constraint Capture

Referring again to FIG. 1, constraints and their verification results can be edited, viewed, and validated through XVS constraint capture editor 145. XVS core 105 supports UI configuration 140 database which can be configured for pre-defined and user-defined constraints and their associated results. XVS constraint capture editor 145 provides the user with a consistent methodology for managing and reviewing their constraint information. Specific UI configurations 140 can be shared with other design starts. XVS constraint capture editor 145 provides an environment for constraint capture that ensures design specific requirements can be viewed and edited using the same functionality as any built-in constraint. Consistent constraint management is necessary to ensure these new requirements can be applied to the current design and reused in the future. XVS constraint capture editor 145 allows the user to organize UI configuration 140 so that the new user-defined constraints and their verification results are presented in the appropriate domain. For example, a new electrical requirement would be added to the SI domain. Thus, XVS 100 provides standard mechanisms for constraint capture. Once UI configuration 140 is setup, the configuration can be exported for reuse with any other design.

In this embodiment of the invention, XVS core 105 supports two mechanisms to export/import constraint information for a design. The first mechanism enables the user to export/import all constraint information thus providing a way to backup/restore an entire design. The second mechanism allows the user to export/import generic constraint information. Generic constraints are those objects/constraints which are not design specific. For example, "Net Class ECL" is generic but "Net ABC" is not. Generic constraint information can be easily reused between designs and is more commonly referred to as a technology file. Thus, XVS 100 supports a common archiving mechanism when creating a backup or saving the requirements for reuse. The key advantage to these common capture mechanisms is that usability, adoption, and reuse of design specific constraints are greatly improved.

Driving Implementation

Providing implementation support is critical to ensure the application can utilize extensibility while creating the design. Referring to FIG. 1, Application 125 will utilize XVS core 105 for verification/validation tasks needed to optimize the implementation of a computer aided design 199. XVS 100 includes an application integration model described below and illustrated in FIGS. 4 and 5.

Figure 4:
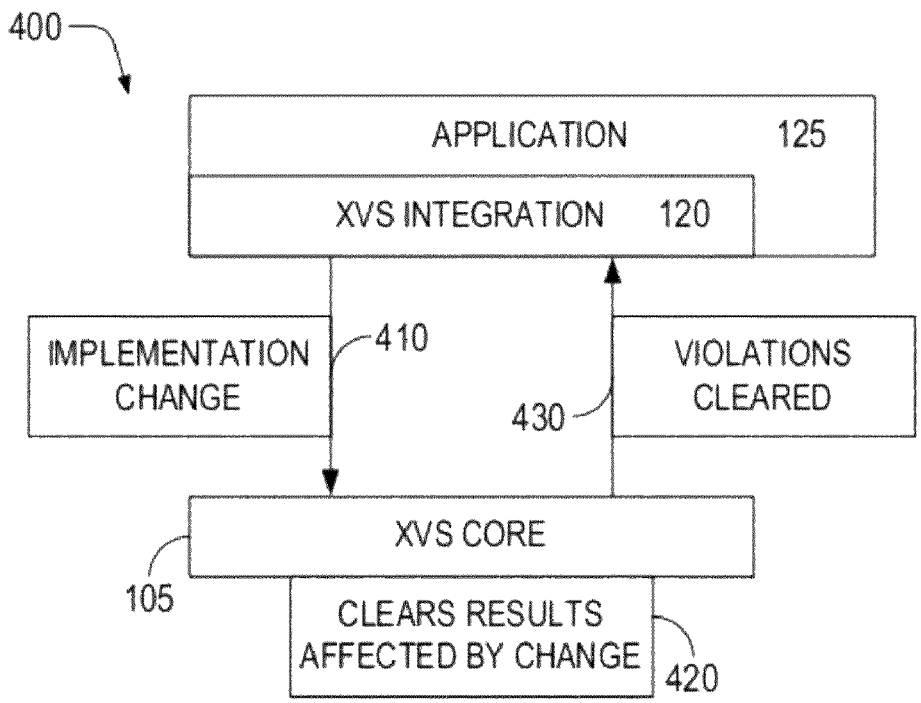
FIG. 4 illustrates a data flow diagram of a model for clearing existing results according to an embodiment of the present invention.

Referring to FIG. 4, a data flow diagram is illustrated of an embodiment for clearing existing results 400 to ensure stale results are removed when they are no longer valid. The same elements of verification application 125, an XVS integration 120 module, and an XVS core 105 are shown providing the same functions and features as described with reference to FIG. 1. Referring to FIG. 4, in a first step 410, application 125 (through XVS integration 120) informs the XVS core 105 of an implementation change 410 to trigger cleanup. Then, at a step 420, the XVS core 105 clears results for the object(s) affected by the implementation change 410. The Application Programming Interface (API) for clearing existing results supports a mode which controls which kinds of results are removed. The modes supported that may be applied are for example, clear all results, clear results in domain XYZ, or clear results for constraint ABC. Then, in a step 430, the XVS core 105 informs application 125 (via XVS integration 120 module) of violations which have been cleared in step 420. The verification application may be managing all violations and as such needs to be informed if any are removed.

Figure 5:
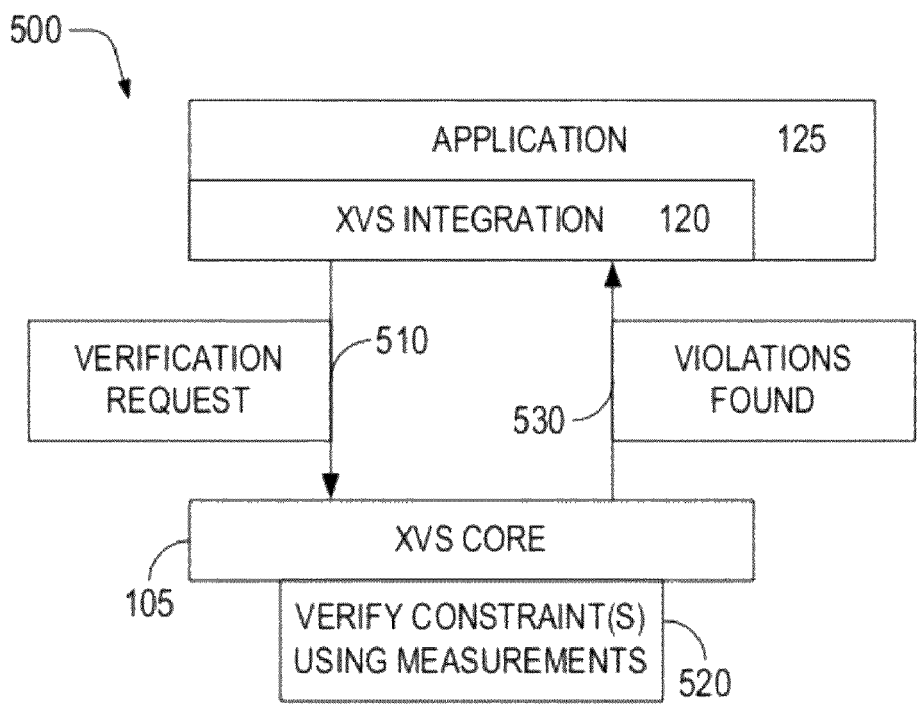
FIG. 5 illustrates a data flow diagram of a model for verification according to an embodiment of the present invention.

FIG. 5 illustrates a data flow diagram of an embodiment for verification 500. The same elements of an application 125, XVS integration 120, and a XVS core 105 are shown providing the same functions and features as described with reference to FIG. 1. Referring to FIG. 5, for individual implementation changes or for batch reporting of multiple changes, in a first step 510, application 125 (through XVS integration 120) triggers a verification request in XVS core 105. Verification request 510 can be made for a specific constraint, related constraints, or an entire domain of constraints. Next, in a step 520, XVS core 105 performs verification/validation of appropriate constraint(s) by triggering the associated measurement(s) to determine if a violation exists. Then, at a step 530, XVS core 105 informs application 125 (through XVS integration 120) of individual violations that have been found for each validated constraint. In one example, clearing existing results 400 step is performed before verification 500. Note that the measurement will not be triggered if the results already exist. If the results exist, the verification request need only examine these results to determine the violation status. This methodology is employed to boost performance as running the measurement is typically the most expensive operation during verification. For this operating technique to be optimized, it is important that the application clear results when they become stale as described in reference to FIG. 4.

Verification for Implementation and Feedback

XVS 100 provides various mechanisms to support implementation and feedback of correctness in an integrated application. Once the constraints are defined and captured, application 125 can utilize XVS core 105 to ensure the implementation meets these requirements. If not validated online during design implementation, the constraints can be batch checked so feedback is provided on the design's overall correctness.

To supports online and batch verification, XVS 100 includes the following three API's. The first API is to clear the current results for an object according to the model referenced in FIG. 4. XVS core 105 considers all results for an object up-to-date unless told otherwise by application 125. When an object changes, this API is called to clear the current results. XVS core 105 clears differently based upon the object being processed. For example, if a higher-level (parent) object is being cleared, then the results on the children of the object are also cleared. The second API is to verify an object according to the model referenced in FIG. 5. During implementation or batch reporting, the application calls the XVS core to validate an object and determine its correctness. This API allows the application to verify a single constraint or a set of constraints based upon their domain and online status. For example, validate all online routing constraints. If the object has no results, XVS core 105 will trigger the appropriate measurements to generate them. For each result, XVS core 105 will then determine if a violation exists and will return an overall status after all verification has been performed. The third API, also according to the model referenced in FIG. 5, is to query an object's violation status. Using the object's current results, this API can be used by the application to determine which constraints are failing and which are not. This API also allows the application to query for a single constraint or a set of constraints based upon their domain. For example, a query may be directed to the violation status for all SI constraints.

When a violation occurs, application 125 is informed by XVS core 105 using an API callback. This API enables the application to respond to each violation. Each violation will have a unique ID so that XVS core 105 can be queried for more details. The application may respond by adjusting its implementation according to the constraint's definition. For example, if a constraint is defined with a category of length and uses a minimum comparison function, a violation would imply that the length needs to be increased. Alternatively, application 125 may respond by simply reporting the violation on its canvas or in a violation window. Thus, XVS 100 is tightly integrated to the application through a simple API so that the application can utilize XVS core 105 to control the application's implementation. This tangible advantage ensures that design re-work is minimized since the correct-by-design philosophy is optimized.

Feedback of all constraints and results is critical in understanding the design's overall wellness. XVS 100 provides a configurable spreadsheet interface that provides the user control to organize the objects, and constraints for each domain. Each spreadsheet displays the appropriate constraints and results, and rolls up the worst case for easy review and correction. As with the extensions, the user-defined spreadsheet display can be exported for reuse in other designs. Thus, XVS 100 provides concise feedback on the design's overall wellness for requirements in each domain, online, or in batch mode. This is an improvement over the lengthy batch reports used to review the current implementation in prior systems. The ability to review multiple verification results in a common integrated environment means that debugging and violation resolution are improved compared to prior systems.

Although the examples and terminology used to describe the present invention have been drawn from the field of electronic design, it should be obvious to one skilled in the CAD art that the programming architecture and system embodiments of this invention can be applied to any CAD verification application or suite of applications. The present invention is applicable to any design field where extensibility of verification tool features by the user is desirable including but not limited to the fields of architecture, engineering, bioengineering, genomics, graphic design, and web design.

Example Computer System

Figure 6:
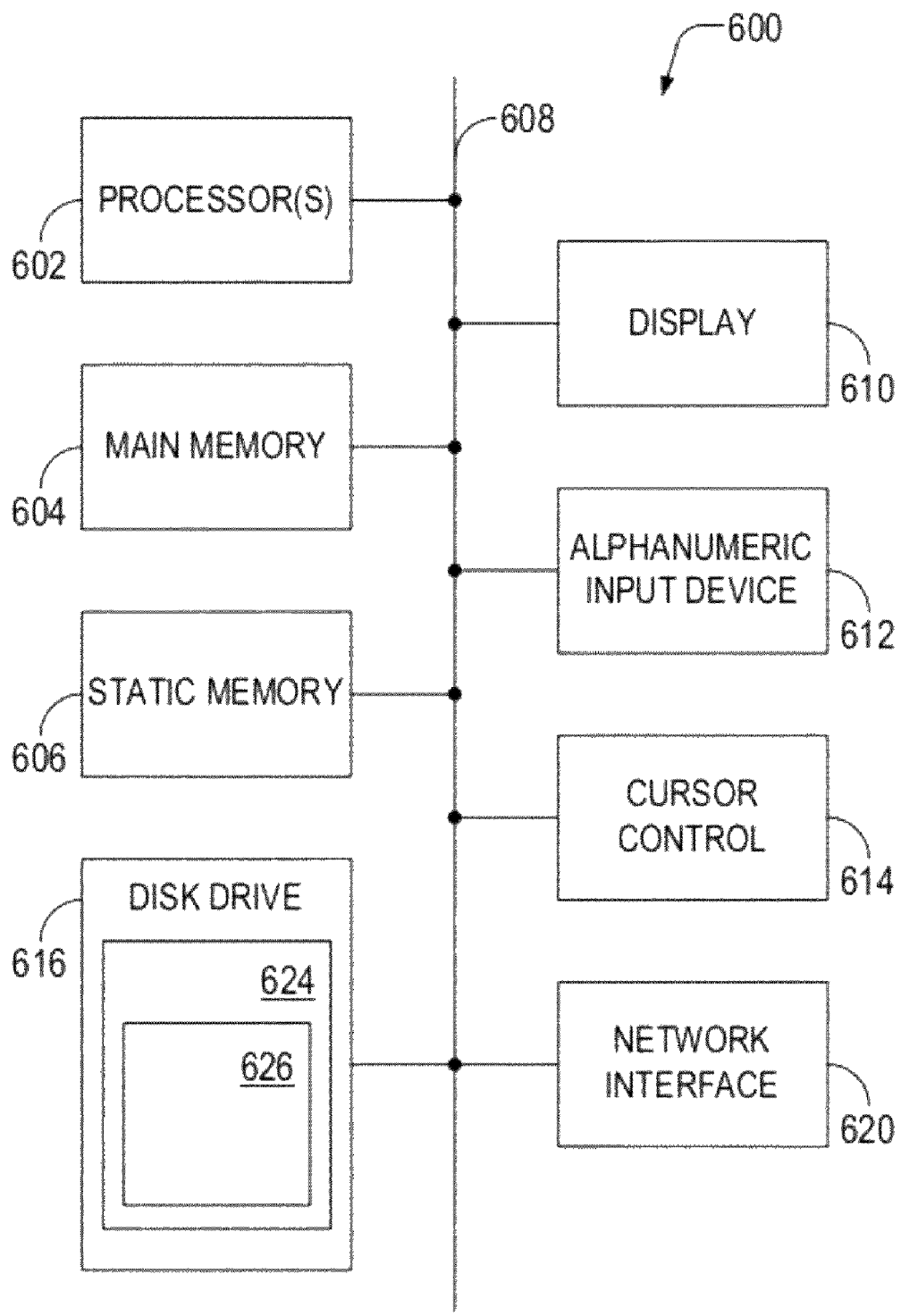
FIG. 6 is a block diagram illustrating an example computer system according to an embodiment of the present invention

Various embodiments of the present invention have been described in the context of an application, database, or core that performs product validation functionalities and an editor interface operable to access and view those functionalities. An example computer system on which such functionalities can be implemented is now described with reference to FIG. 6. Numerous features described with reference to FIG. 6 can be omitted, e.g., a server will generally not include video display unit 610. Computer system 600 may be used to perform one or more of the operations described herein. In alternative embodiments, the computer system environment may comprise a server, network router, a network switch, a network bridge, Personal Digital Assistant (PDA), a cellular telephone, a web appliance, or any other machine capable of executing a sequence of instructions that specify actions to be taken by that machine.

The computer system 600 includes a processor 602, a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alpha-numeric input device 612 (e.g., a keyboard), a cursor control device 614 (e.g., a mouse), a disk drive unit 616, and a network interface device 620.

The disk drive unit 616 includes a machine-readable medium 624 on which is stored a set of instructions (i.e., software) 626 embodying any one, or all, of the methodologies described above. The software 626 is also shown to reside, completely or at least partially, within the main memory 604 and/or within the processor 602. The software 626 may further be transmitted or received via the network interface device 620. For the purposes of this specification, the term "machine-readable medium" shall be taken to include any medium that is capable of storing or encoding a sequence of instructions for execution by the computer and that cause the computer to perform any one of the methodologies of the present invention. The term "machine-readable medium" shall accordingly be taken to include, but not be limited to, solid-state memories, optical and magnetic disks, and carrier wave signals.

In the description above, for the purposes of explanation, numerous specific details have been set forth. However, it is understood that embodiments of the invention may be practiced without these specific details. In other instances, well-known circuits, structures and techniques have not been shown in detail in order not to obscure the understanding of this description.

Embodiments of the present invention include various processes. The processes may be performed by hardware components or may be embodied in machine-executable instructions, which may be used to cause one or more processors programmed with the instructions to perform the processes. Alternatively, the processes may be performed by a combination of hardware and software.

Embodiments of the present invention may be provided as a computer program product that may include a machine-readable medium having stored thereon instructions, which may be used to program a computer (or other electronic device) to perform a process according to one or more embodiments of the present invention. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention.

What is claimed is:

1. A method of verifying a computer aided design, the method comprising:
    with one or more computers,
        capturing a plurality of user-defined constraints from a user to verify a computer aided design with an integrated verification application;
        registering one or more pre-defined constraints associated with said integrated verification application to verify the computer aided design;
        centrally managing the plurality of user-defined constraints in a database;
        initiating a verification task with said integrated verification application including a validation of the plurality of user-defined constraints and a validation of the one or more pre-defined constraints;
        executing said verification task to verify said computer aided design and generate a result in response to the plurality of user-defined constraints and the one or more pre-defined constraints; and
        communicating said result to said integrated verification application.

2. The method of claim 1, wherein
    the database is a constraint database to store the plurality of user-defined constraints;
    said managing utilizes an editor and said constraint database
to create and view the plurality of user-defined constraints.

3. The method of claim 1, wherein
    said user-defined constraint includes a user-defined function.

4. The method of claim 3, wherein said user-defined function is one of
    a syntax function utilized to check a value corresponding to said user-defined constraint,
    a measurement function utilized to compute said result,
    a comparison function utilized to verify said result, and
    a predicate function utilized to construct said measurement.

5. The method of claim 1, wherein
    said user-defined constraint is associated with a first computer aided design and is exportable to a second computer aided design.

6. The method of claim 1, wherein
    said executing clears an existing result.

7. The method of claim 1, further comprising:
    capturing said result of said verification task centrally;
    wherein said capturing utilizes a capture editor and an interface database, said capture editor being utilized for editing and viewing said result, said interface database storing a user-defined interface and a pre-defined interface, said capturing being substantially identical for said user-defined interface as for said pre-defined interface, and said user-defined interface is associated with a first computer aided design and exportable to a second computer aided design.

8. The method of claim 1, wherein
    the integrated verification application verifies computer aided designs of electronic circuits.

9. A computer aided design verification system for verification of computer aided designs, the comprising:
    a processor to execute one or more instructions to provide
        an integrated verification application having a pre-defined constraint, the integrated verification application to verify one or more computer aided designs;
        an editor to create and view a user-defined constraint, said user defined constraint being provided by an external user;
        a constraint database to store said user-defined constraint and said pre-defined constraint; and
        a central core in communication with the integrated verification application, the editor, and the constraint database the central core to centrally manage said computer aided design verification system, wherein said central core to
            initiate and execute a verification task,
            generate a result, and
            communicate said result to said integrated verification application.

10. The computer aided design verification system of claim 9, wherein
    said integrated verification application registers and said pre-defined constraint to initialize said central core.

11. The computer aided design verification system of claim 9, wherein
    said editor, said constraints database, and said central core to manage said user-defined constraint in substantially the same manner as said pre-defined constraint.

12. The computer aided design verification system of claim 9, wherein
    said pre-defined constraint is one of
        a pre-defined predicate function,
        a pre-defined syntax function,
        a pre-defined comparison function,
        a pre-defined measurement function, and
        a pre-defined characteristic.

13. The computer aided design verification system of claim 9, wherein
    said pre-defined constraint is utilized to assist construction of said user-defined constraint by said external user.

14. The computer aided design verification system of claim 9, wherein
    said integrated verification application initiates said verification task, and
    said central core communicates said result to said integrated application.

15. The computer aided design verification system of claim 9, wherein
    said user-defined constraint is one of
        a user-defined characteristic and
        a user-defined function.

16. The computer aided design verification system of claim 15, wherein
    said user-defined function is one of
        a syntax function utilized to check a value corresponding to said user-defined constraint, a measurement function utilized to compute said result, a comparison function utilized to verify said result, and a predicate function utilized to construct said measurement.

17. The computer aided design verification system of claim 9, wherein
said user-defined constraint is exportable to a second computer aided design.

18. The computer aided design verification system of claim 9, wherein
said central core executes a verification task to clear an existing result.

19. The computer aided design verification system of claim 9, further comprising:
a capture editor utilized for editing and viewing said result; and
an interface database utilized for storing a user-defined interface and a pre-defined interface;
wherein said capture editor, said interface database, and said central core capture said user-defined interface in substantially identical manner as said pre-defined interface, and said user-defined interface being exportable to a second computer aided design.

20. The computer aided design verification system of claim 9, wherein
the integrated verification application verifies computer aided designs of electronic circuits.

21. A method for design specific verification of a circuit design, the method comprising:
capturing user-defined functions of a custom constraint for a first circuit design including user-defined syntax, predicate, measurement, and comparison functions;
receiving one or more definitions for the custom constraint including at least an identifier of the custom constraint for the first circuit design;
storing the one or more definitions and the user-defined functions of the custom constraint into a database on a non-transitory machine readable medium for reuse by verification applications in the verification of the first circuit design and subsequent circuit designs;
receiving a request to verify the first circuit design including a validation of the custom constraint being met or violated; and
generating results indicating that the custom constraint was met or violated by the first circuit design.

22. The method of claim 21, further comprising:
editing one or more of the stored user-defined functions of the custom constraint; and
storing the edited user-defined functions of the custom constraint back into the database.

23. The method of claim 21, wherein
the user-defined syntax function is utilized to check a value corresponding to the user-defined constraint,
the user-defined predicate function is utilized to construct a measurement;
the user-defined measurement function is utilized to compute the results responsive to the measurement; and
the user-defined comparison function is utilized to verify the results.

24. The method of claim 21, wherein
the one or more definitions for the custom constraint further include one or more of
a data type indicating a storage class for the custom constraint,
a category indicating a category of the custom constraint,
units indicating measurement units in response to the category,
a range indicating a valid range responsive to the category,
valid objects indicating valid object types for the custom constraint,
a domain indicating the applicable domain where the custom constraint is used, and
one or more analysis flags indicating analysis behavior of the custom constraint.

25. The method of claim 24, wherein
the one or more analysis flags include one or more of
a fully-routed flag indicating to not analyze until an object is fully routed when set,
a fully-placed flag indicated to not analyze until all related objects are fully placed when set,
an on-line flag indicating to analyze in real time as implementation changes are made if set and if not set then to batch analyze,
an analyze-on-constraint-change flag indicated to rerun the analysis when a constraint value changes when set, and if not set, indicating that only the comparison function is triggered on a constraint change, and
a read-only flag indicating to not allow editing of the constraint.

* * * * *